(12) United States Patent
Zhang

(10) Patent No.: US 12,240,364 B2
(45) Date of Patent: Mar. 4, 2025

(54) CARRIER BODY AND CHILD CARRIER THEREWITH

(71) Applicant: BAMBINO PREZIOSO SWITZERLAND AG, Steinhausen (CH)

(72) Inventor: Da Liang Zhang, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 30 days.

(21) Appl. No.: 17/928,344

(22) PCT Filed: May 26, 2021

(86) PCT No.: PCT/EP2021/064035
§ 371 (c)(1),
(2) Date: Nov. 29, 2022

(87) PCT Pub. No.: WO2021/239804
PCT Pub. Date: Dec. 2, 2021

(65) Prior Publication Data
US 2023/0202368 A1 Jun. 29, 2023

(30) Foreign Application Priority Data
May 29, 2020 (CN) .......................... 202010482306.0

(51) Int. Cl.
*B60N 2/28* (2006.01)
*B60N 2/818* (2018.01)
*A47C 7/38* (2006.01)

(52) U.S. Cl.
CPC ........... *B60N 2/818* (2018.02); *B60N 2/2851* (2013.01); *A47C 7/38* (2013.01); *B60N 2/2827* (2013.01)

(58) Field of Classification Search
CPC .......... B60N 2/2851; B60N 2/818; A47C 7/38
See application file for complete search history.

(56) References Cited

U.S. PATENT DOCUMENTS

| 6,378,950 | B1 | 4/2002 | Takamizu et al. | |
|---|---|---|---|---|
| 2010/0060055 | A1* | 3/2010 | Chen | B60N 2/2821 297/256.11 |
| 2015/0035329 | A1* | 2/2015 | Sparling | B60N 2/2851 297/216.13 |

FOREIGN PATENT DOCUMENTS

| CN | 102343846 A | 2/2012 |
|---|---|---|
| CN | 104742765 A | 7/2015 |

(Continued)

OTHER PUBLICATIONS

International Search Report and Written Opinion issued in corresponding International Application No. PCT/EP2021/064035, dated Sep. 10, 2021, pp. 1-10, European Patent Office, Rijswijk, Netherlands.

(Continued)

*Primary Examiner* — Syed A Islam
(74) *Attorney, Agent, or Firm* — HAUPTMAN HAM, LLP

(57) ABSTRACT

A carrier body includes a main body, a headrest and a height adjusting mechanism. An engaging portion is formed on the main body. The headrest is movably disposed on the main body. The height adjusting mechanism is installed on the headrest and for cooperating with the engaging portion to adjust a height of the headrest relative to the main body. The height adjusting mechanism includes a driving component slidably disposed on the headrest and a locking component. The locking component includes a rotating connecting portion rotatably connected to the headrest, a locking portion and a driving connecting portion movably connected to the driving component. The driving component slides to drive (Continued)

the locking component to rotate relative to the headrest to drive the locking portion to engage with or disengage from the engaging portion.

20 Claims, 10 Drawing Sheets

(56) References Cited

FOREIGN PATENT DOCUMENTS

| | | | |
|---|---|---|---|
| CN | 105015370 | A | 11/2015 |
| CN | 105711450 | A * | 6/2016 |
| CN | 104742765 | B | 9/2017 |
| CN | 107199922 | A | 9/2017 |
| CN | 105015370 | B | 10/2017 |
| CN | 208530351 | U | 2/2019 |
| CN | 111186347 | A | 5/2020 |
| CN | 112060991 | A | 12/2020 |
| JP | 3201637 | U | 12/2015 |
| TW | 201714768 | A | 5/2017 |
| WO | 2017047308 | A1 | 3/2017 |

OTHER PUBLICATIONS

First Office Action issued in Chinese Patent Application No. 2020104823060, mailed Dec. 22, 2023, 17 pgs.

Notice of Allowance issued in Chinese Patent Application No. 2020104823060, mailed May 21, 2024, 6 pgs.

Xingwei, Wang, et al.; "Measure technology of the center of gravity of ejection seat-pilot system"; Journal of Beijing University of Aeronautics and Astronautics; Jan. 2005, vol. 31, No. 1, 4 pgs.

* cited by examiner

CARRIER BODY AND CHILD CARRIER THEREWITH

CROSS REFERENCE TO RELATED APPLICATIONS

This is a 371 U.S. National Phase of International Application No. PCT/EP2021/064035, filed on May 26, 2021, which claims the benefit of CN Patent Application No. 202010482306.0, filed on May 29, 2020, and the contents of this application are incorporated herein by reference.

FIELD OF THE INVENTION

One or more embodiments of the present invention relate to a carrier body and a child carrier according to at least one or more of the pre-characterizing clauses of claims 1 and 13.

BACKGROUND

With development of the society, more and more families have their own cars, and there are more and more opportunities for children to travel with their parents by cars. Since children lack self-protection skills, the children may suffer more serious injuries than adults in car accidents. In order to solve the above problems, child car seats are provided. Child car seats can be installed on car seats, which can not only ensure the children's riding safety, but also provide riding comfort for the children.

A child car seat usually includes a seat body and a carrier body detachably installed on the seat body. The seat body is provided with an International Standards Organization FIX (ISOFIX) device configured to engage with a connecting port of a vehicle seat. The carrier body includes a main body, a headrest and an adjusting mechanism for adjusting a height of the headrest. In order to ensure a child's riding safety and riding comfort, the height of the headrest has to be adjusted according to a position of the child's head. However, the conventional adjusting mechanism has a complicated structure. Besides, the conventional adjusting mechanism is located at a rear portion of the main body, and a user has to stretch his/her hand into a space between the vehicle seat and the main body to operate the adjusting mechanism located at the rear portion of the main body. Therefore, the conventional adjusting mechanism also has inconvenient operation. Furthermore, when the user stretches his/her hand into the space between the vehicle seat and the main body, the user may be unable to operate the adjusting mechanism to adjust the headrest to a proper position correctly due to limitation of the small space, which causes the child car seat to fail to ensure the child's riding safety and riding comfort.

SUMMARY

With this in mind, one or more embodiments of the present invention aims at a carrier body whose headrest is easy to be adjusted, and a child carrier therewith.

This is achieved in at least one embodiment by a carrier body and a child carrier according to one or more of claims 1 and 13. The dependent claims pertain to corresponding further developments and improvements.

As will be seen more clearly from the detail description following below, the claimed carrier body includes a main body, a headrest and a height adjusting mechanism. The main body includes an engaging portion. The headrest is movably disposed on the main body. The height adjusting mechanism is installed on the headrest and cooperates with the engaging portion to adjust a height of the headrest relative to the main body. The height adjusting mechanism includes a driving component and a locking component. The driving component is slidably disposed on the headrest. The locking component includes a rotating connecting portion, a locking portion and a driving connecting portion. The driving connecting portion is movably connected to the driving component. The rotating connecting portion is rotatably connected to the headrest, and the driving component drives the locking component to rotate relative to the headrest to drive the locking portion to engage with or disengage from the engaging portion during a sliding movement of the driving component.

According to an embodiment of the present invention, the driving connecting portion includes a sliding shaft. A driving slot is formed on the driving component. The sliding shaft passes through the driving slot and is slidable relative to the driving slot along a longitudinal direction of the driving slot, and the driving component drives the locking component to rotate by a sliding cooperation of the sliding shaft and the driving slot during the sliding movement of the driving component.

According to an embodiment of the present invention, the locking portion includes a locking pin. The locking pin is for engaging with or disengaging from the engaging portion, and the driving connecting portion and the locking portion are respectively connected to two opposite end parts of the rotating connecting portion.

According to an embodiment of the present invention, the headrest includes a headrest body and a covering plate. The covering plate is connected to the headrest body and located between the headrest body and the main body, and the rotating connecting portion is rotatably connected to the covering plate.

According to an embodiment of the present invention, the driving component is slidable relative to the headrest along an up-down direction of the headrest.

According to an embodiment of the present invention, the height adjusting mechanism further includes a releasing component installed on the headrest. The driving connecting portion is movably connected to a first end of the driving component. The releasing component is connected to a second end of the driving component. The releasing component is for driving the driving component to slide along an up-down direction of the headrest, and the driving component drives the locking component to rotate to drive the locking portion to engage with or disengage from the engaging portion when the releasing component drives the driving component to slide along the up-down direction of the headrest.

According to an embodiment of the present invention, the releasing component is pivotally connected to the second end of the driving component, so that the releasing component pivotally drives the driving component to slide.

According to an embodiment of the present invention, the height adjusting mechanism further includes a resilient component for driving the driving component to slide to drive the locking portion to engage with the engaging portion.

According to an embodiment of the present invention, the resilient component is disposed between the driving component and the headrest.

According to an embodiment of the present invention, the main body includes a backrest. The headrest is movably disposed on the backrest. The engaging portion is disposed on the backrest, and the height of the headrest relative to the backrest is adjusted by a cooperation of the height adjusting mechanism and the engaging portion.

According to an embodiment of the present invention, the engaging portion includes a plurality of engaging slots. The plurality of engaging slots are arranged along an up-down direction of the backrest at intervals, and the locking portion is for engaging with or disengaging from the corresponding engaging slot.

According to an embodiment of the present invention, the carrier body further includes a harness. An end of the harness is fixedly connected to the main body. A through hole is formed on the locking component, and the harness passes through the through hole, so that a height of the harness is adjusted when the height of the headrest relative to the main body is adjusted.

Furthermore, the claimed child carrier includes a seat body and the carrier body of any one of the aforementioned embodiments, and the carrier body is rotatably or detachably installed on the seat body.

In summary, in one or more embodiments of the present invention, since the height adjusting mechanism is installed on the headrest, it allows a user to operate the driving component on the headrest directly or operate the releasing component on the headrest to drive the driving component, so as to drive the locking component to engage with or disengage from the engaging portion for adjusting the height of the headrest. Therefore, one or more embodiments of the present invention has advantages of simple structure and convenient operation. Furthermore, one or more embodiments of the present invention can ensure a child's riding safety and riding comfort because one or more embodiments of the present invention prevents a situation that the user cannot operate the height adjusting mechanism to adjust the headrest to a proper position correctly due to space limitations.

These and other objectives of one or more embodiments of the present invention will no doubt become obvious to those of ordinary skill in the art after reading the following detailed description of an embodiment that is illustrated in the various figures and drawings.

BRIEF DESCRIPTION OF THE DRAWINGS

In the following, the invention is further illustrated by way of example, taking reference to the accompanying drawings. Thereof

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "right", "left", "front", "back", etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive. Also, the term "connect" is intended to mean either an indirect or direct mechanical connection. Thus, if a first device is connected to a second device, that connection may be through a direct mechanical connection, or through an indirect mechanical connection via other devices and connections.

Figure 1:
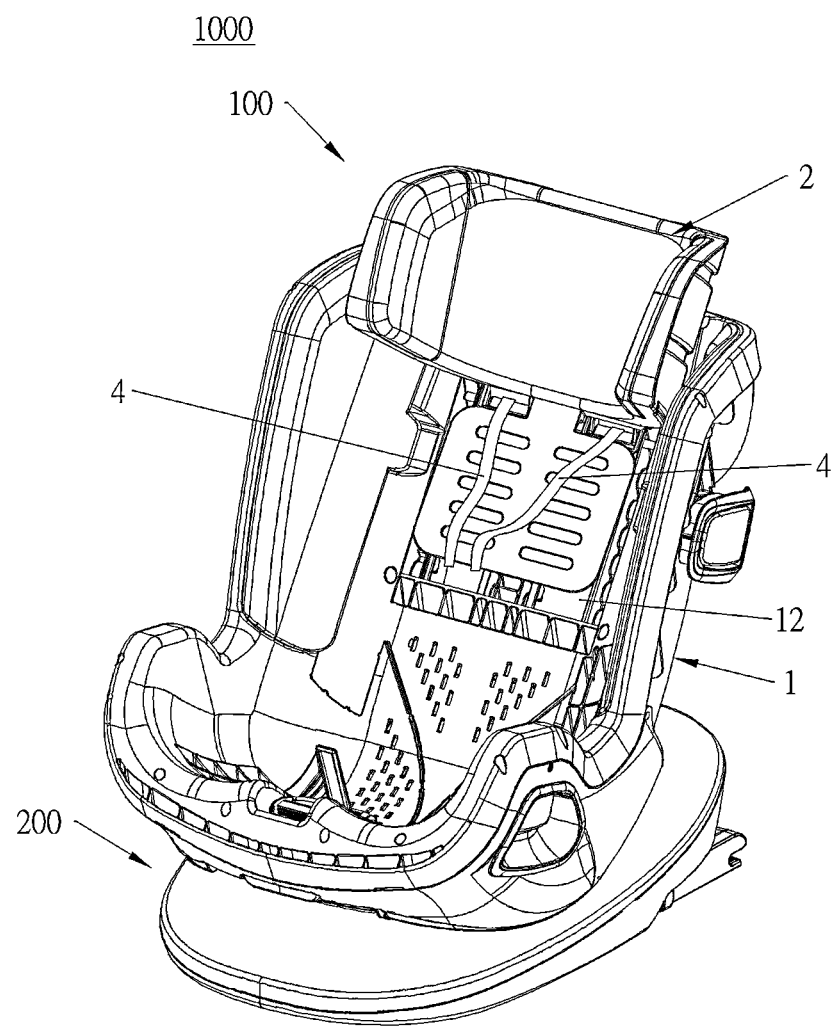
FIG. 1 and FIG. 2 are diagrams of a child carrier in different states according to an embodiment of the present invention.
Figure 2:
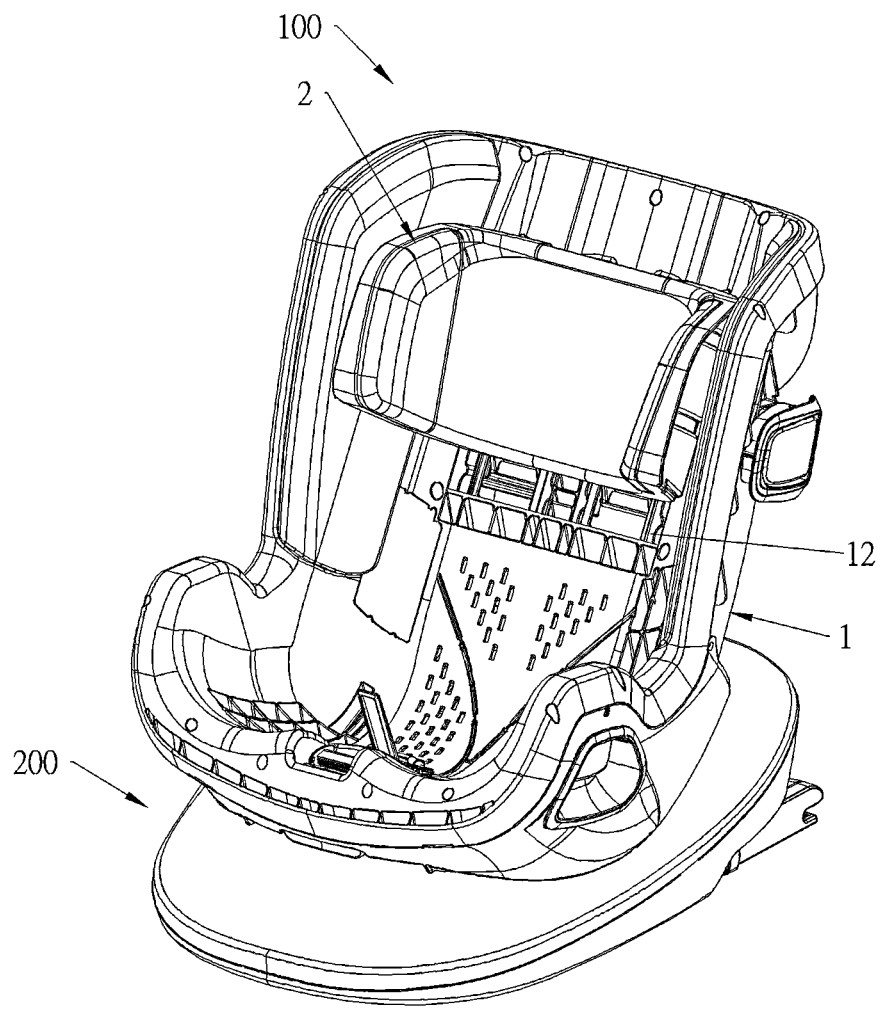

Please refer to FIG. 1 and FIG. 2. FIG. 1 and FIG. 2 are diagrams of a child carrier 1000 in different states according to an embodiment of the present invention. As shown in FIG. 1 and FIG. 2, the child carrier 1000 includes a carrier body 100 and a seat body 200. The carrier body 100 is detachably installed on the seat body 200 and configured for accommodating a child. Furthermore, the carrier body 100 is rotatably switchable relative to the seat body 200 between a forward-facing position and a rearward-facing position. In this embodiment, the child carrier 1000 can be a child car seat, and the seat body 200 can be a base detachably installed on a vehicle seat by a vehicle safety belt and or an International Standards Organization FIX (ISOFIX) device. However, the present invention is not limited to this embodiment. For example, in another embodiment, the carrier body and the seat body can be configured to be irrrotatable relative to each other or undetachable from each other. Alternatively, in another embodiment, the child carrier can be a child stroller, i.e., the seat body can be a stroller frame.

Figure 3:
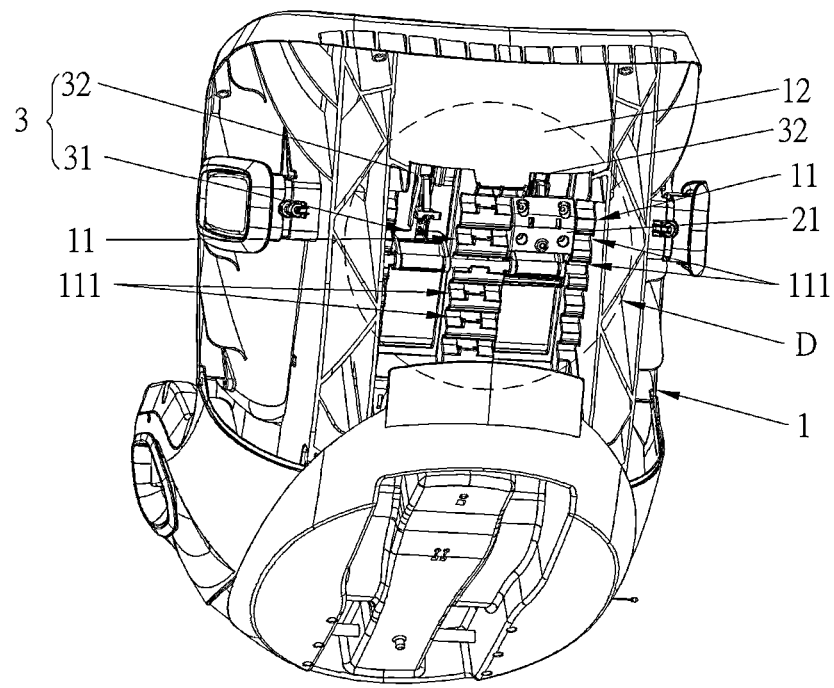
FIG. 3 is a partial internal structural diagram of a carrier body according to the embodiment of the present invention.
Figure 4:
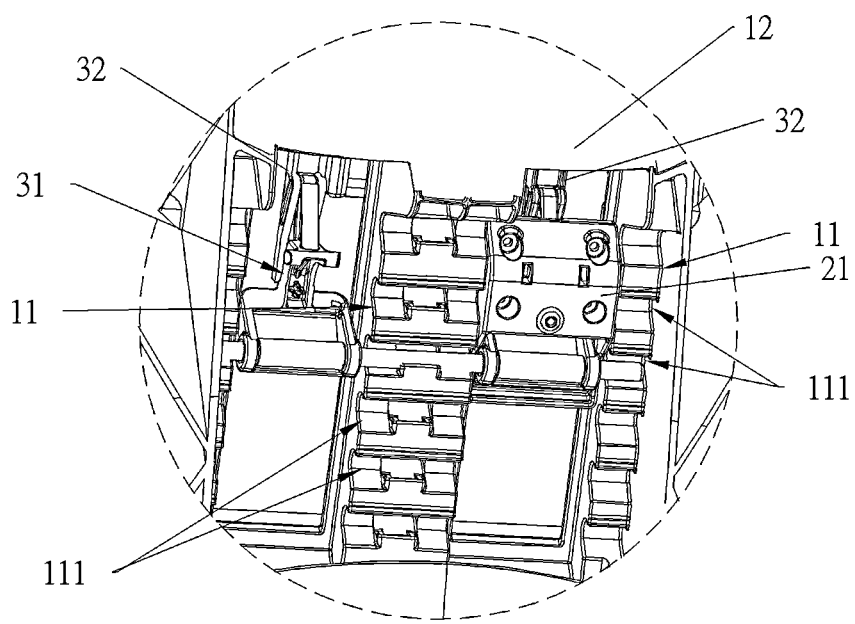
FIG. 4 is an enlarged diagram of a D portion of the carrier body shown in FIG. 3 according to the embodiment of the present invention.
Figure 5:
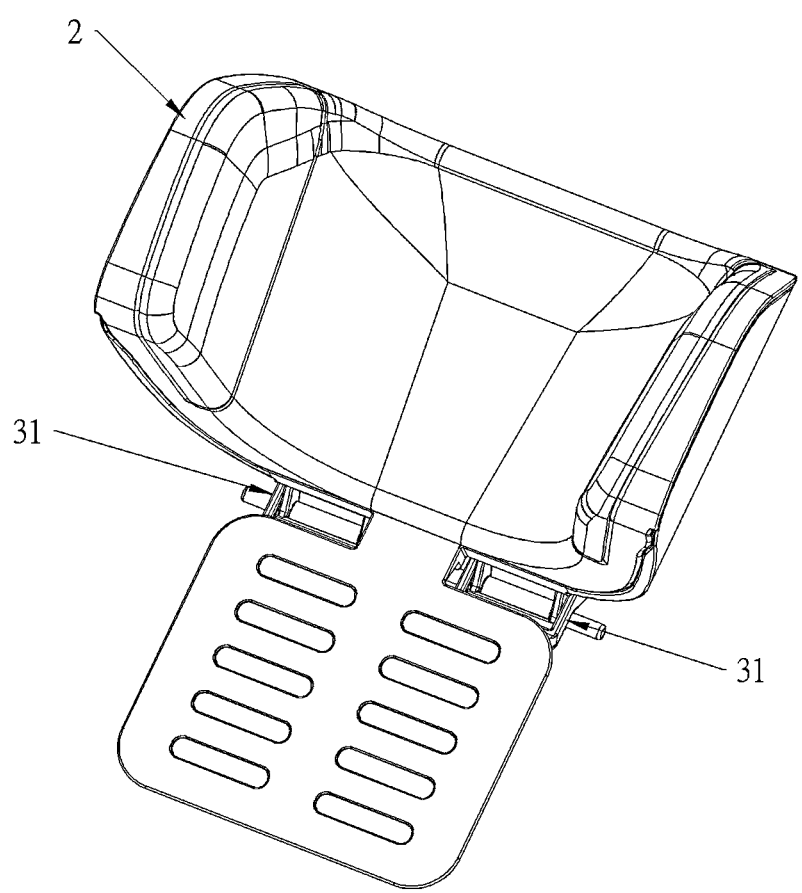
FIG. 5 and FIG. 6 are partial diagrams of the carrier body at different views according to the embodiment of the present invention.
Figure 6:
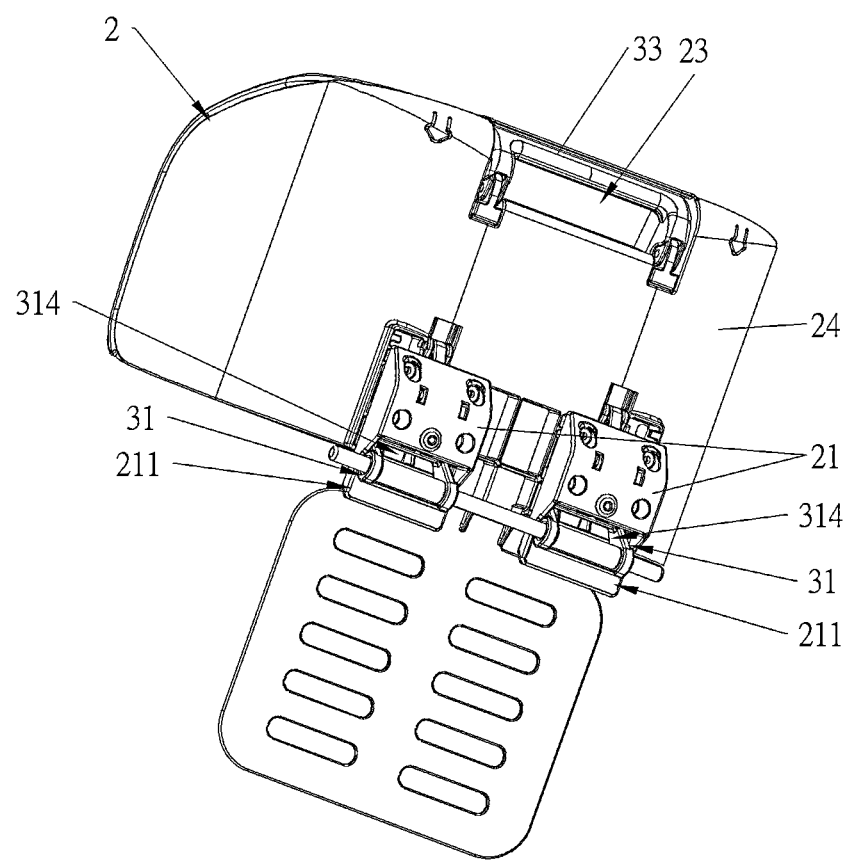
Figure 7:
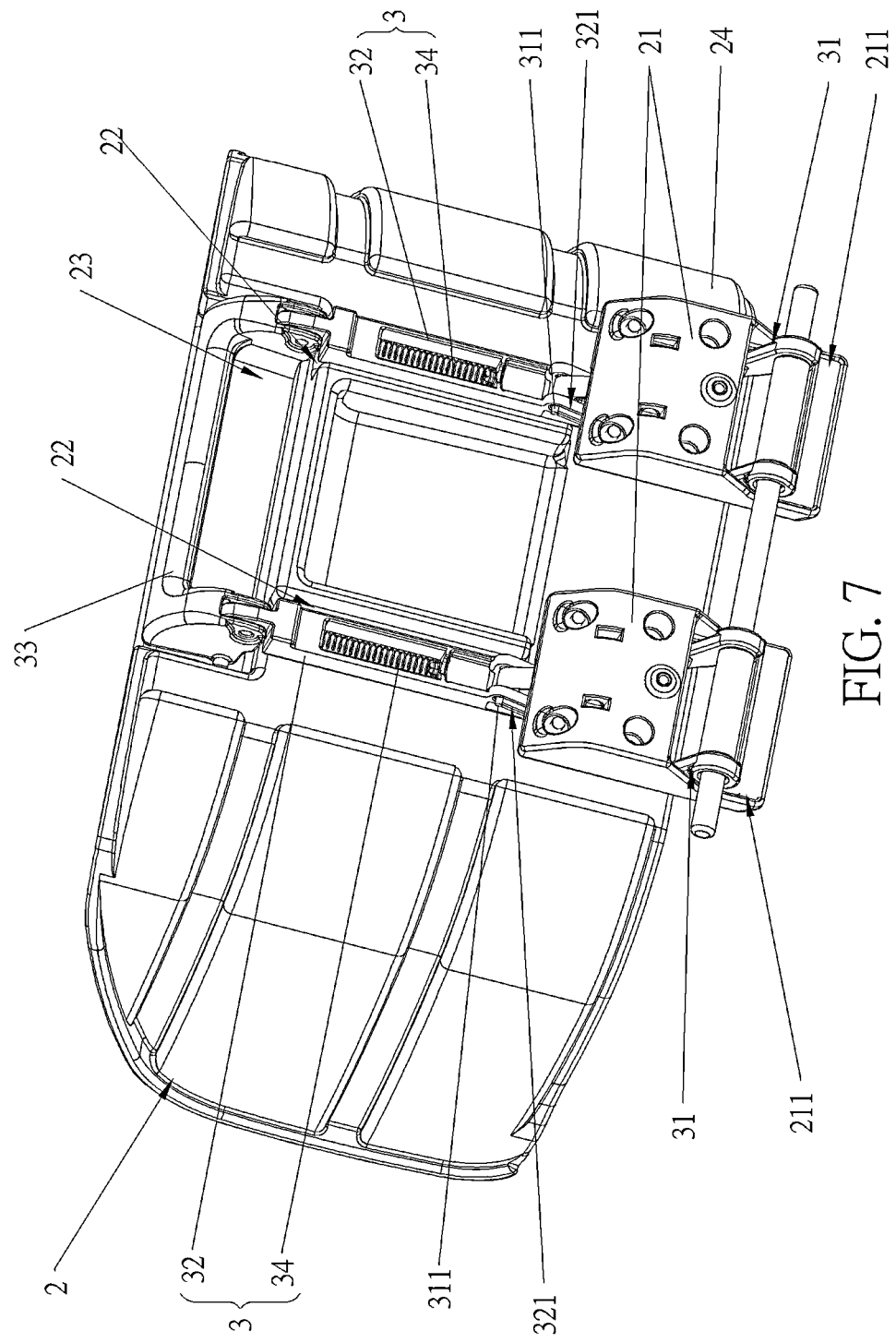
FIG. 7 is a partial diagram of the carrier body as each of locking components is located at a locking position according to the embodiment of the present invention.
Figure 8:
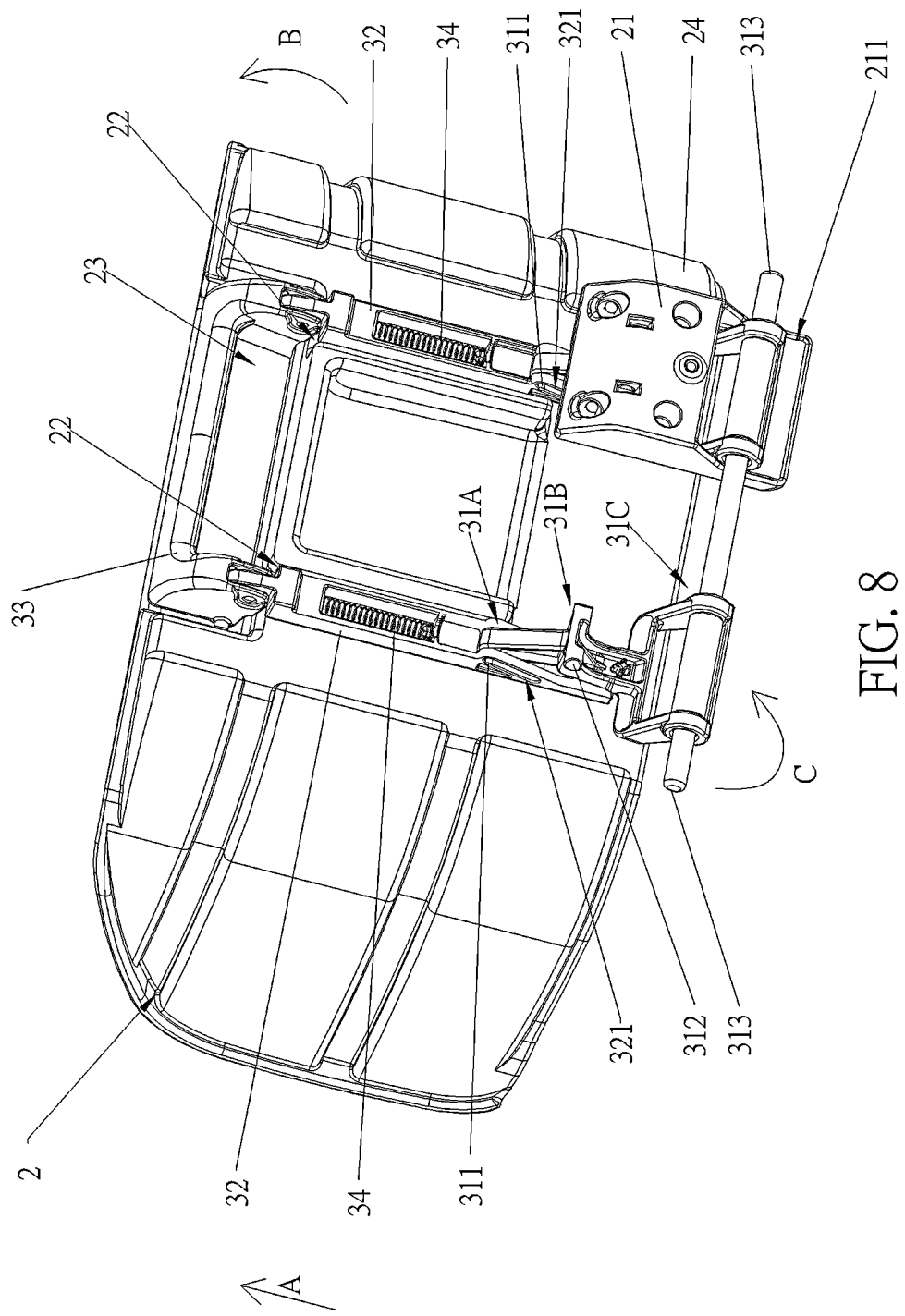
FIG. 8 is another partial diagram of the carrier body as each of the locking components is located at the locking position according to the embodiment of the present invention.
Figure 9:
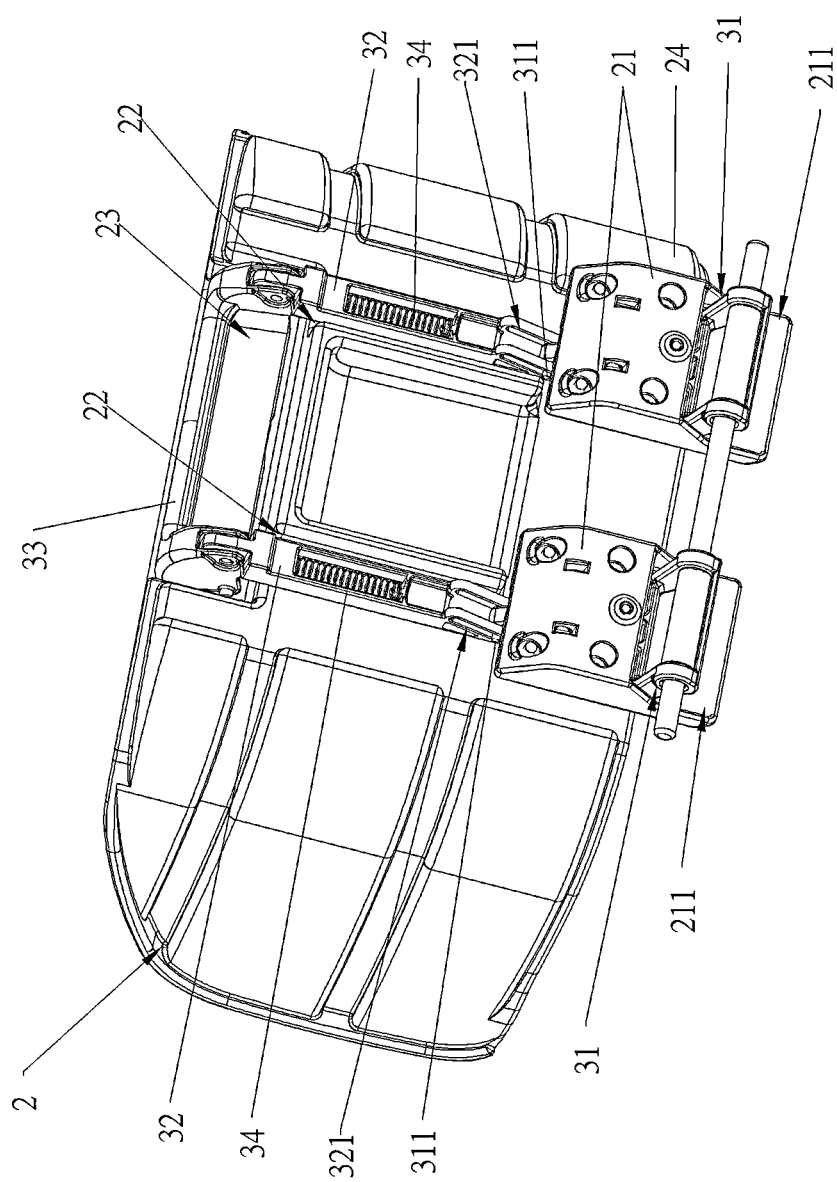
FIG. 9 is a partial diagram of the carrier body as each of locking components is located at a releasing position according to the embodiment of the present invention.
Figure 10:
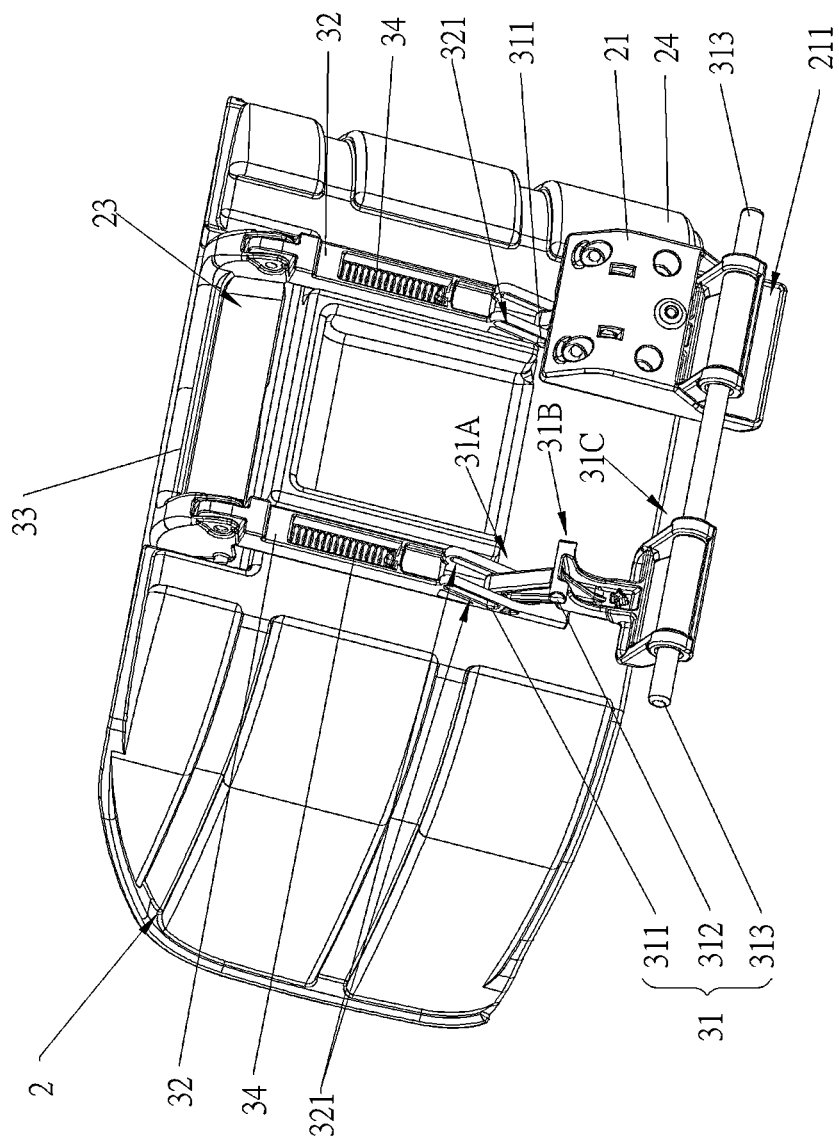
FIG. 10 is another partial diagram of the carrier body as each of the locking components is located at the releasing position according to the embodiment of the present invention.
Figure 11:
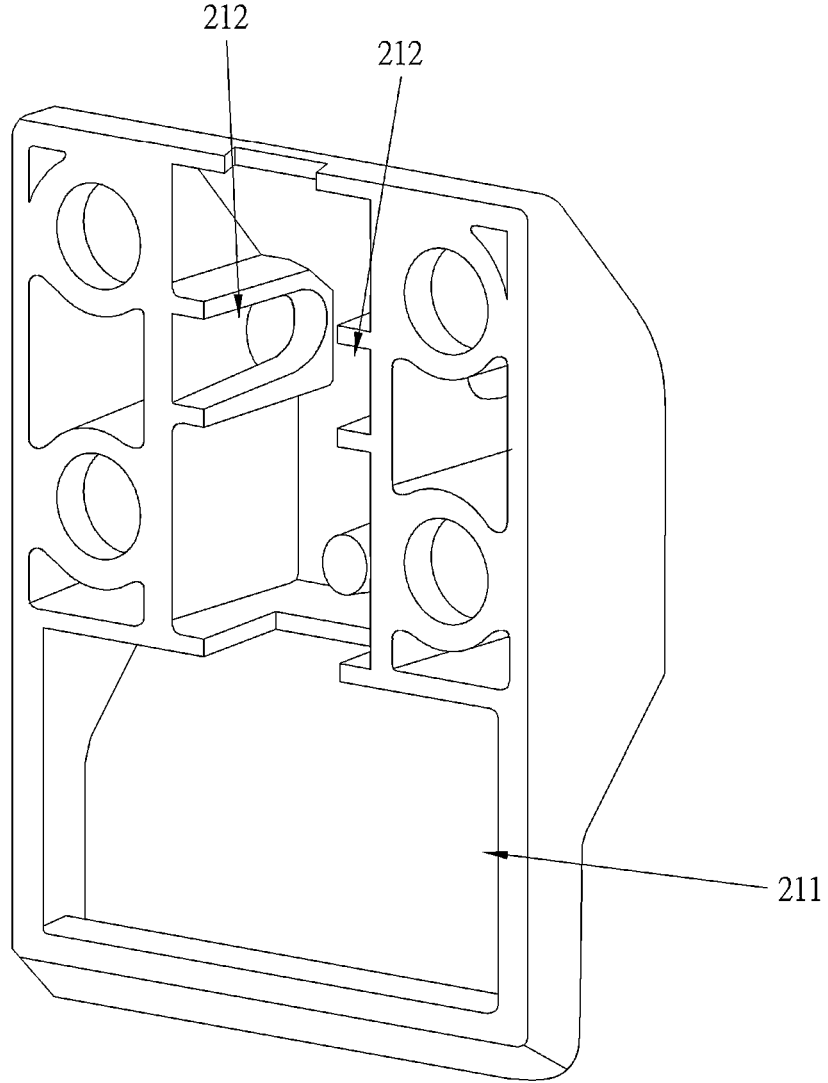
FIG. 11 is a diagram of a covering plate according to the embodiment of the present invention.

Please refer to FIG. 1 to FIG. 10. FIG. 3 is a partial internal structural diagram of the carrier body 100 according to the embodiment of the present invention. FIG. 4 is an enlarged diagram of a D portion of the carrier body 100 shown in FIG. 3 according to the embodiment of the present invention. FIG. 5 and FIG. 6 are partial diagrams of the carrier body 100 at different views according to the embodiment of the present invention. FIG. 7 is a partial diagram of the carrier body 100 as each of locking components 31 is located at a locking position according to the embodiment of the present invention. FIG. 8 is another partial diagram of the carrier body 100 as each of the locking components 31 is located at the locking position according to the embodiment of the present invention. FIG. 9 is a partial diagram of the carrier body 100 as each of locking components 31 is located at a releasing position according to the embodiment of the present invention. FIG. 10 is another partial diagram of the carrier body 100 as each of the locking components 31 is located at the releasing position according to the embodiment of the present invention. As shown in FIG. 1 to FIG. 10, the carrier body 100 includes a main body 1, a headrest 2 and a height adjusting mechanism 3. Two engaging portions 11 are formed on the main body 1. The headrest 2 is movably disposed on the main body 1 and movable relative to the main body 1 along an up-down direction of the main body 1. The height adjusting mechanism 3 is installed on the headrest 2 and movable relative to the main body 1 along the up-down direction of the main body 1 along with the headrest 2. The height adjusting mechanism 3 is configured to cooperate with the two engaging portions 11 for allowing or restraining a movement of the headrest 2 relative to the main body 1 along the up-down direction of the main body 1, so as to adjust a height of the headrest 2 relative to the main body 1.

Specifically, the height adjusting mechanism 3 includes two locking components 31 and two driving components 32. The two driving components 32 and the two locking components 31 are movably disposed on the headrest 2. Each of the locking components 31 is movable between the locking position as shown in FIG. 7 and FIG. 8 and the releasing position as shown in FIG. 9 and FIG. 10. When each of the locking components 31 is located at the locking position, each of the locking components 31 engages with the corresponding engaging portion 11 for restraining the movement of the headrest 2 relative to the main body 1 along the up-down direction of the main body 1, so as to position the height of the headrest 2 relative to the main body 1. When each of the locking components 31 is located at the releasing position, each of the locking components 31 disengages from the corresponding engaging portion 11 for allowing the movement of the headrest 2 relative to the main body 1 along the up-down direction of the main body 1, so as to adjust the height of the headrest 2 relative to the main body 1. Each of the driving components 32 is connected to the corresponding locking component 31 and configured to drive the corresponding locking component 31 to move between the locking position and the releasing position.

As shown in FIG. 3 to FIG. 10, in this embodiment, each of the driving components 32 is slidably disposed on the headrest 2. Each of the locking components 31 includes a driving connecting portion 31A, a rotating connecting portion 31B and a locking portion 31C. The rotating connecting portion 31B is rotatably connected to the headrest 2. The locking portion 31 is configured to engage with or disengage from the corresponding engaging portion 11. The driving connecting portion 31A is movably connected to the corresponding driving component 32. Each of the driving components 32 can drive the corresponding locking component 31 to rotate relative to the headrest 2 to drive the corresponding locking portion 31C to engage with or disengage from the corresponding engaging portion 11 during a sliding movement of each of the driving components 32.

As shown in FIG. 7 to FIG. 10, two sliding slots 22 are formed on the headrest 2 and arranged along an up-down direction of the headrest 2, which is identical to the up-down direction of the main body 1. Each of the driving components 32 is slidably disposed on the corresponding sliding slot 22. Each of the sliding slots 22 can guide the corresponding driving component 32 to slide along the up-down direction of the headrest 2. However, the number of the sliding slot and the sliding direction of the driving component are not limited to this embodiment. It depends on practical demands Furthermore, as shown in FIG. 7 to FIG. 10, in order to make the operation of the height adjusting mechanism 3 more convenient, the height adjusting mechanism 3 further includes a releasing component 33 and two resilient components 34. Each of the resilient components 34 is configured to drive the corresponding driving component 32 to slide along a locking direction opposite to a releasing direction A as shown in FIG. 8, so as to drive the corresponding locking component 31 to engage with the corresponding engaging portion 11. The releasing component 33 is movably installed on the headrest 2 and connected to the two driving components 32. The releasing component 33 is configured to drive the two driving components 32 to slide along the releasing direction A. When each of the driving components 32 is driven by the releasing component 33 to overcome a resilient force of the corresponding resilient component 34 to slide along the releasing direction A, each of the driving components 32 can drive the corresponding locking component 31 to rotate relative to the headrest 2 to disengage from the corresponding engaging portion 11 along a disengaging direction C as shown in FIG. 8.

Specifically, as shown in FIG. 7 to FIG. 10, a recess 23 is formed on an upper portion of the headrest 2. The releasing component 33 is installed on the recess 23 and located above the two driving components 32. A first end of each of the driving components 32, i.e., an upper end of each of the driving components 32, is connected to the releasing component 33. Each of the locking components 31 is located beneath the corresponding driving component 32. A second end of each of the driving components 32, i.e., a lower end of each of the driving components 32, is movably connected to the corresponding locking component 31. A first end of each of the resilient components 34, i.e., an upper end of each of the resilient components 34, is fixedly connected to the corresponding driving component 32. A second end of each of the resilient components 34, i.e., a lower end of each of the resilient components 34, is fixedly connected to the headrest 2.

More specifically, as shown in FIG. 7 to FIG. 10, the upper end of each of the driving components 32 is pivotally connected to the releasing component 33, so that the releasing component 33 can drive the two driving components 32 to slide along the releasing direction A to drive the two locking components 31 to rotate along the disengaging direction C to disengage from the two engaging portions 11 when the releasing component 33 pivots along an operating direction B as shown in FIG. 8.

In order to prevent an unintentional disengagement of each of the locking components 31 and the corresponding engaging portion 11, each of the resilient components 34 can be configured to be resiliently extended at all times, even when each of the locking components 31 is located at the locking position, so that each of the resilient components 34 can keep generating the resilient force for driving the corresponding driving component 32 to slide along the locking direction.

However, the structure of the height adjusting mechanism is not limited to this embodiment. For example, in another embodiment, the releasing component and the resilient component can be omitted, i.e., the user can directly operate the driving component to drive the locking component to engage with or disengage from the engaging portion.

As shown in FIG. 7 to FIG. 10, each of the driving connecting portions 31A includes a sliding shaft 311. A driving slot 321 is formed on each of the driving components 32. Each of the sliding shafts 311 passes through the corresponding driving slot 321 and slidable relative to the corresponding driving slot 321 along a longitudinal direction of the corresponding driving slot 321. Each of the driving components 32 drives the corresponding locking component 31 to rotate by a sliding cooperation of the corresponding sliding shaft 311 and the corresponding driving slot 321 to drive each of the locking components 31 to engage with or disengage from the corresponding engaging portion 11 during the sliding movement of each of the driving components 32.

In this embodiment, each of the sliding shafts 311 extends along a left-right direction of the main body 1. The longitudinal direction of each of the driving slots 321 is inclined relative to the up-down direction of the main body 1, i.e., each of the driving slots 321 can be an inclined slot. When each of the driving components 32 slides along the up-down direction of main body 1, each of the sliding shafts 311 can be driven by the corresponding driving slot 321 to move along a front-rear direction of the main body 1 to drive each of the driving components 32 to rotate along the disengaging direction C.

In addition, as shown in FIG. 7 to FIG. 10, each of the rotating connecting portions 31B includes a rotating shaft 312 extending along the left-right direction of the main body 1, and each of the locking portions 31C includes a locking pin 313 extending along the left-right direction of the main body 1. Each of the rotating connecting portions 31B is rotatably connected to the headrest 2 by the corresponding rotating shaft 312. Each of the locking pins 313 is configured to engage with or disengage from the corresponding engaging portion 11. The driving connecting portion 31A and the locking portion 31C of each of the locking components 31 are respectively connected to two ends of the rotating connecting portion 31B of each of the locking components 31, so that each of the locking components 31 can be formed in a lever structure, i.e., the rotating shaft 312 can be located at a fulcrum of the lever structure, and the sliding shaft 311 and the locking pin 313 can be respectively located at two ends of the lever structure. By the aforementioned configuration, each of the locking components 31 can be driven by the sliding cooperation of the corresponding sliding shaft 311 and the corresponding driving slot 321 to rotate relative to the headrest 2 along the disengaging direction C or an engaging direction opposite to the disengaging direction C about the corresponding rotating shaft 312.

As shown in FIG. 7 to FIG. 11, the headrest 2 includes two covering plates 21 and a headrest body 24. The two covering plates 21 are connected to the headrest body 24 and located between the headrest body 24 and the main body 1. Specifically, each of the covering plate 21 can be fastened on the headrest body 24 by at least one screw element. Each of the covering plates 21 extends toward the corresponding locking component 31. Each of the rotating connecting portions 31B is rotatably connected to the corresponding covering plate 21. However, the present invention is not limited to this embodiment. For example, in another embodiment, the covering plate can be omitted, i.e., each of the rotating connecting portions can be rotatably connected to the headrest body directly.

Specifically, two long slots 212 are formed on each of the covering plates 21. Two ends of each of the rotating shafts 312 are respectively disposed inside the corresponding long slots 212 and slidable relative to the corresponding long slots 212. An end portion of each of the long slots 212 can restrain the corresponding rotating shaft 312 for restraining a rotating angle of the corresponding rotating shaft 312. Therefore, it prevents any interference between each of the locking components 31 and any other structure adjacent to the corresponding driving component 32 during a rotating movement of each of the locking components 31. However, the number of the long slot is not limited to this embodiment. For example, in another embodiment, there can be only one long slot formed on the covering plate.

Besides, a penetrating hole 211 is formed on each of the covering plates 21. Each of the locking components 31 can pass through the corresponding penetrating hole 211. It prevents any interference between each of the locking components 31 and the corresponding covering plate 21.

As shown in FIG. 1 to FIG. 4, the main body 1 includes a backrest 12. The headrest 2 is movably disposed on the backrest 12. The two engaging portions 11 are disposed on the backrest 12. A height of the headrest 2 relative to the backrest 12, i.e., the height of the headrest 2 relative to the main body 1, can be adjusted by a cooperation of the height adjusting mechanism 3 and the two engaging portions 11. Specifically, each of the two engaging portions 11 can include a plurality of engaging slots 111 arranged along an up-down direction of the backrest 12 at intervals. Each of the locking portions 31C is configured to engage with the corresponding engaging slot 111. In this embodiment, the backrest 12 can be a fixed structure. In another embodiment, the backrest can be a movable structure movable along the up-down direction of the main body.

As shown in FIG. 1 to FIG. 4 and FIG. 6, the carrier body 100 further includes a harness 4. An end of the harness 4 is fixedly connected to the main body 1. A through hole 314 is formed on each of the locking components 31. The harness 4 passes through the through holes 314 of the two locking components 31 and the penetrating holes 211 of the two covering plates 21, so that a height of the harness 4 relative to the main body 1 can be adjusted when adjusting the height of the headrest 2 relative to the main body 1.

In this embodiment, the two locking components 31, the two driving components 32, the two resilient components 34 and the two covering plates 21 are disposed on a rear portion of the backrest 12 and located at a right side and a left side symmetrically. The two engaging portions 11 are disposed on the main body 1 and located at the right side and the left side symmetrically. However, the present invention is not limited to this embodiment. For example, in another embodiment, the height adjusting mechanism can includes only one locking component, one driving component, one resilient component and one covering plate at one side, and the main body can include only one engaging portion at one side.

Detailed description for the operational principle of the child carrier 1000 of the present invention is provided as follows. When it is desired to adjust the height of the headrest 2 relative to the main body 1, the user can press the releasing component 33 to drive the releasing component 33 to pivot along the operating direction B about a pivoting direction of the releasing component 33 and each of the driving components 32, so that each of the driving components 32 can be driven by the releasing component 33 to overcome the resilient force of the corresponding resilient component 34 to slide along the releasing direction A as shown in FIG. 8. When each of the driving components 32 slides along the releasing direction A, each of the driving components 32 can drive the corresponding locking component 31 by the sliding cooperation of the corresponding sliding shaft 311 and the corresponding driving slot 321 to rotate the corresponding locking component 31 relative to the headrest 2 from the locking position as shown in FIG. 7 and FIG. 8 to the releasing position as shown in FIG. 9 and FIG. 10 along the disengaging direction C for disengaging the corresponding locking pin 313 from the corresponding engaging portion 11. When each of the locking pins 313 is disengaged from the corresponding engaging portion 11, the user can adjust the height of the headrest 2 relative to the main body 1 by moving the headrest 2.

After the headrest 2 is moved to a proper position, the user can release the releasing component 33, so that each of the resilient components 34 can drive the corresponding driving component 32 to slide along the locking direction opposite to the releasing direction A and drive the releasing component 33 to pivotally recover along a direction opposite to the operating direction B. When each of the driving components 32 slides along the locking direction, each of the driving components 32 can drive the corresponding locking component 31 by the sliding cooperation of the corresponding sliding shaft 311 and the corresponding driving slot 321 to rotate along the engaging direction C for engaging the corresponding locking pin 313 with the corresponding engaging portion 11, so as to lock the headrest 2 for completing adjustment of the height of the headrest 2 relative to the main body 1. When it is desired to re-adjust the height of the headrest 2 relative to the main body 1, it only has to repeat the aforementioned operation again.

In contrast to the prior art, in one or more embodiments of the present invention, since the height adjusting mechanism is installed on the headrest, it allows a user to operate the driving component on the headrest directly or operate the releasing component on the headrest to drive the driving component, so as to drive the locking component to engage with or disengage from the engaging portion for adjusting the height of the headrest. Therefore, one or more embodiments of the present invention has advantages of simple structure and convenient operation. Furthermore, one or more embodiments of the present invention can ensure a child's riding safety and riding comfort because one or more embodiments of the present invention prevents a situation that the user cannot operate the height adjusting mechanism to adjust the headrest to a proper position correctly due to space limitations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A carrier body comprising:
   a main body, comprising an engaging portion formed on the main body;
   a headrest movably disposed on the main body; and
   a height adjusting mechanism installed on the headrest and cooperating with the engaging portion to adjust a height of the headrest relative to the main body, the height adjusting mechanism comprising:
   a driving component slidably disposed on the headrest; and
   a locking component comprising a rotating connecting portion, a locking portion and a driving connecting portion, the driving connecting portion being movably connected to the driving component, the rotating connecting portion being rotatably connected to the headrest, and the driving component driving the locking component to rotate relative to the headrest to drive the locking portion to engage with or disengage from the engaging portion during a sliding movement of the driving component.

2. The carrier body of claim 1, wherein the driving connecting portion comprises a sliding shaft, a driving slot is formed on the driving component, the sliding shaft passes through the driving slot and is slidable relative to the driving slot along a longitudinal direction of the driving slot, and the driving component drives the locking component to rotate by a sliding cooperation of the sliding shaft and the driving slot during the sliding movement of the driving component.

3. The carrier body of claim 2, wherein the locking portion comprises a locking pin, the locking pin is for engaging with or disengaging from the engaging portion, and the driving connecting portion and the locking portion are respectively connected to two opposite end parts of the rotating connecting portion.

4. The carrier body of claim 1, wherein the headrest comprises a headrest body and a covering plate, the covering plate is connected to the headrest body and located between the headrest body and the main body, and the rotating connecting portion is rotatably connected to the covering plate.

5. The carrier body of claim 1, wherein the driving component is slidable relative to the headrest along an up-down direction of the headrest.

6. The carrier body of claim 1, wherein the height adjusting mechanism further comprises a releasing component installed on the headrest, the driving connecting portion is movably connected to a first end of the driving component, the releasing component is connected to a second end of the driving component, the releasing component is for driving the driving component to slide along an up-down direction of the headrest, and the driving component drives the locking component to rotate to drive the locking portion to engage with or disengage from the engaging portion when the releasing component drives the driving component to slide along the up-down direction of the headrest.

7. The carrier body of claim 6, wherein the releasing component is pivotally connected to the second end of the driving component, so that the releasing component pivotally drives the driving component to slide.

8. The carrier body of claim 1, wherein the height adjusting mechanism further comprises a resilient component for driving the driving component to slide to drive the locking portion to engage with the engaging portion.

9. The carrier body of claim 8, wherein the resilient component is disposed between the driving component and the headrest.

10. The carrier body of claim 1, wherein the main body comprises a backrest, the headrest is movably disposed on the backrest, the engaging portion is disposed on the backrest, and the height of the headrest relative to the backrest is adjusted by a cooperation of the height adjusting mechanism and the engaging portion.

11. The carrier body of claim 10, wherein the engaging portion comprises a plurality of engaging slots, the plurality of engaging slots are arranged along an up-down direction of the backrest at intervals, and the locking portion is for engaging with or disengaging from the corresponding engaging slot.

12. The carrier body of claim 1, further comprising a harness, an end of the harness being fixedly connected to the main body, a through hole being formed on the locking component, and the harness passing through the through hole, so that a height of the harness is adjusted when the height of the headrest relative to the main body is adjusted.

13. A child carrier comprising a seat body and a carrier body rotatably or detachably installed on the seat body, wherein the carrier body comprises:
   a main body, comprising an engaging portion formed on the main body;
   a headrest movably disposed on the main body; and
   a height adjusting mechanism installed on the headrest and cooperating with the engaging portion to adjust a height of the headrest relative to the main body, the height adjusting mechanism comprising:
a driving component slidably disposed on the headrest; and
a locking component comprising a rotating connecting portion, a locking portion and a driving connecting portion, the driving connecting portion being movably connected to the driving component, the rotating connecting portion being rotatably connected to the headrest, and the driving component driving the locking component to rotate relative to the headrest to drive the locking portion to engage with or disengage from the engaging portion during a sliding movement of the driving component.

14. The child carrier of claim 13, wherein the driving connecting portion comprises a sliding shaft, a driving slot is formed on the driving component, the sliding shaft passes through the driving slot and is slidable relative to the driving slot along a longitudinal direction of the driving slot, and the driving component drives the locking component to rotate by a sliding cooperation of the sliding shaft and the driving slot during the sliding movement of the driving component.

15. The child carrier of claim 14, wherein the locking portion comprises a locking pin, the locking pin is for engaging with or disengaging from the engaging portion, and the driving connecting portion and the locking portion are respectively connected to two opposite end parts of the rotating connecting portion.

16. The child carrier of claim 13, wherein the headrest comprises a headrest body and a covering plate, the covering plate is connected to the headrest body and located between the headrest body and the main body, and the rotating connecting portion is rotatably connected to the covering plate.

17. The child carrier of claim 13, wherein the driving component is slidable relative to the headrest along an up-down direction of the headrest.

18. The child carrier of claim 13, wherein the height adjusting mechanism further comprises a releasing component installed on the headrest, the driving connecting portion is movably connected to a first end of the driving component, the releasing component is connected to a second end of the driving component, the releasing component is for driving the driving component to slide along an up-down direction of the headrest, and the driving component drives the locking component to rotate to drive the locking portion to engage with or disengage from the engaging portion when the releasing component drives the driving component to slide along the up-down direction of the headrest.

19. The child carrier of claim 18, wherein the releasing component is pivotally connected to the second end of the driving component, so that the releasing component pivotally drives the driving component to slide.

20. The child carrier of claim 13, wherein the height adjusting mechanism further comprises a resilient component for driving the driving component to slide to drive the locking portion to engage with the engaging portion.

* * * * *